United States Patent
Olyha, Jr. et al.

[11] Patent Number: 5,870,078
[45] Date of Patent: Feb. 9, 1999

[54] REDUCED COST POINTING STICK CIRCUIT

[75] Inventors: Robert Stephen Olyha, Jr., Poughkeepsie; Joseph Dela Rutledge, Mahopac, both of N.Y.

[73] Assignee: International Business Machines Corporation, Armonk, N.Y.

[21] Appl. No.: 623,075

[22] Filed: Mar. 28, 1996

[51] Int. Cl.$^6$ .................................................... G09G 5/08
[52] U.S. Cl. ...................... 345/157; 345/173; 345/174; 341/120; 341/168; 341/169
[58] Field of Search .............................. 345/157, 16, 173, 345/174, 156, 160, 162; 382/187, 204, 218; 178/18.05, 18.01; 341/169, 168, 120

[56] References Cited

U.S. PATENT DOCUMENTS

| | | | |
|---|---|---|---|
| 4,317,956 | 3/1982 | Torok et al. ........................ | 178/18.01 |
| 4,500,879 | 2/1985 | Smith, III et al. ....................... | 345/16 |
| 4,972,496 | 11/1990 | Sklarew .................................. | 382/187 |
| 5,157,737 | 10/1992 | Sklarew .................................. | 382/315 |
| 5,563,959 | 10/1996 | Gallo et al. ............................. | 382/187 |

Primary Examiner—Jeffery A. Hofsass
Assistant Examiner—Davetta Woods
Attorney, Agent, or Firm—Whitham, Curtis & Whitham; Stephen C. Kaufman, Esq.

[57] ABSTRACT

A low-cost circuit processes, with high precision, the output signals of a pointing stick used for controlling a cursor on a computer display screen. A two-stage method of high precision moderate range analog-to-digital (A/D) conversion is combined with a known method of A/D conversion by sweeping a reference voltage across the range of the voltage to be measured at a known rate and noting the time of coincidence. Operational amplifiers of moderate quality are used in an open-loop mode, so that the operational amplifier inputs are high impedance. In order to get sufficient isolation from power supply noise and variations, the analog circuitry is isolated from the supply voltage while measurements are being made. To avoid interference from the digital switching transients of the microprocessor with the analog comparator switching time, the microprocessor is placed in idle mode, thereby removing its internal clock drive signals (and associated transients) from all of the microprocessor's internal circuitry except the timer which is being used to make the measurement. The resulting circuitry is capable of detecting a very small signal in noise spikes many times larger.

12 Claims, 2 Drawing Sheets

REDUCED COST POINTING STICK CIRCUIT

CROSS REFERENCE TO RELATED APPLICATION

This application is related in subject matter to U.S. patent application Ser. No. 08/340,935 filed Nov. 17, 1994, by Joseph D. Rutledge and Edwin J. Selker for "Graphics Display Pointer with Integrated Selection". The disclosure of application Ser. No. 08/340,935 now U.S. Pat. No. 5,696,535 is incorporated herein by reference.

DESCRIPTION

BACKGROUND OF THE INVENTION

1. Field of the Invention

The present invention generally relates to computer user interfaces of the type that control the position of a cursor on a display screen and, more particularly, to a reduced cost circuit for generating digital signals from the analog strain gauge signals of a pointing stick used to control the cursor position and select objects on the display screen.

2. Background Description

A pointing stick is used, for example, to implement the TrackPoint™ cursor controller in International Business Machines' ThinkPad™ lap top computers. This pointing stick is constructed with a cantilever beam on which four strain gauges are mounted to detect flexure of the beam in each of three axes. The analog signals from the strain gauges are converted to digital X and Y signals by an analog-to-digital (A/D) converter. These signals are further processed to generate the final control signals which are used to control the position of the cursor on the display screen.

This implementation of the pointing stick has certain disadvantages. First of all, the low-order bits of the voltage values are read by a hardware analog-to-digital (A/D) converter, which is expensive. Secondly, the configuration of the resistances and operational amplifiers required for three-axis capability interact in a way that requires that at least one of the operational amplifiers be of "instrument" quality, roughly tripling or quadrupling its cost. In addition, the operational amplifiers need to be linear and have a wide output range (rail to rail), which increases their cost.

Consider a strain gauge sensor configuration of two approximately balanced gauges on opposite sides of a cantilever beam, wired in series across a voltage source. The voltage at the junction of the two gauges gives a measure (relative to the supply voltage) of the relative resistances of the two gauges, and thus of the flexure of the beam in the direction connecting the gauges. If an additional fixed resistance is connected in series with the gauges, then the voltage across this resistance gives a measure of the total resistance of the gauges, and thus of the compression/extension of the beam. The changes are to be measured with a precision of a few parts in $10^5$, in the presence of variations in the source voltage of a few percent. A dynamic range of about 250 times the precision is required, but the location of this range is predictable at manufacturing only to within a few percent. Cost is a major consideration; a difference of $1 may decide competitive success.

SUMMARY OF THE INVENTION

It is therefore an object of the present invention to provide an improved and low-cost circuit for processing the output signals of a pointing stick used for controlling a cursor on a computer display screen.

It is another object of the invention to provide a circuit for processing output signals from a pointing stick which generates a signal that can be used to select objects displayed on a display screen.

It is a further object of the invention to provide a pointing stick circuit with provision for isolating the circuit from the source of voltage during critical periods so as to render the measurement insensitive to variations in supply voltage on fast time scales.

According to the invention, a two-stage method of high precision moderate range analog-to-digital (A/D) conversion is combined with a known method of A/D conversion by sweeping a reference voltage across the range of the voltage to be measured at a known rate and noting the time of coincidence. Operational amplifiers of moderate quality are used in an open-loop mode, so that the operational amplifier inputs are high impedance, avoiding the interactions and resulting costs encountered with the prior three-axis capability. In order to get sufficient isolation from power supply noise and variations, the analog circuitry is isolated from the supply voltage while measurements are being made. To avoid interference from the digital switching transients of the microprocessor on the analog comparator switching time, the microprocessor is placed in idle mode, thereby removing its internal clock drive signals (and associated transients) from all of the microprocessor's internal circuitry except the timer which is being used to make the measurement. The resulting circuitry is capable of detecting a very small signal in noise spikes many times larger.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
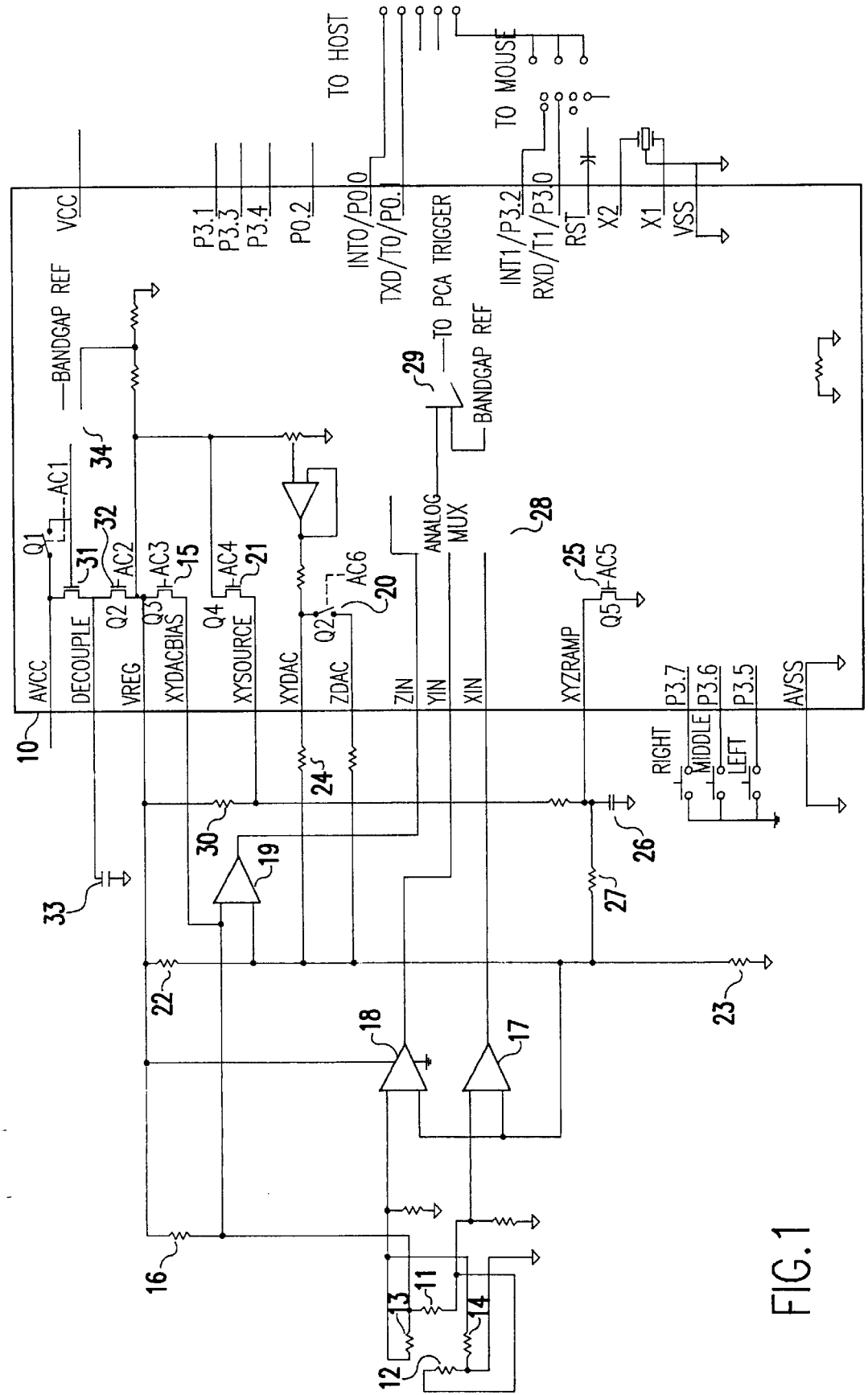
FIG. 1 is schematic diagram of a preferred implementation of the circuit according to the invention.

Referring now to the drawings, and more particularly to FIG. 1, there is shown a preferred implementation of the circuit according to the present invention. This implementation employs an 83C754 integrated circuit (IC) chip manufactured by Phillips, the relevant circuitry of which is shown to the right of heavy vertical line 10. The control signals ACn represent the corresponding bits in a register of the microprocessor, so the control signals ACn are internal to the chip. The 83C754 chip includes a digital-to-analog converter (DAC) which, schematically, is a tapped resistance (e.g., potentiometer) delivering an output voltage which is a proportion of its input voltage VREG determined by the position of the tap. The position of the tap is set by the value in a dedicated register of the microprocessor.

Considering first the off-chip components of the circuit according to the invention, the strain gauges 11, 12, 13, and 14 are mounted on the cantilever beam (not shown) of the pointing stick and connected in two parallel half-bridge circuits. The X and Y input signals are generated by the dividers consisting of the strain gauges 11 and 12 and the strain gauges 13 and 14, respectively. When these signals are being generated, the field effect transistor (FET) 15 is closed (conducting), so the strain gages 11 and 13 are connected to VREG. Thus, voltages X and Y are close to VREG/2. Their exact values depend first on the match between the "rest" resistances of strain gauges 11 and 12 and, respectively, strain gauges 13 and 14, and then on the differential changes between strain gauges 11 and 12 and, respectively, strain gauges 13 and 14, produced by bending of the sensor beam. The useful signal is only this last component, which varies approximately ±3 mV, with a required resolution of about 30 $\mu$V. Simple compression or extension of the beam affects strain gauges 11 and 12 and, respectively, strain gauges 13 and 14, equally, so no change is produced in the X, and respectively Y, signal.

The Z signal is generated with FET 15 open, so the sensor is connected to VREG through resistor 16. The signal is generated by a divider which consists of resistor 16 as the top element and the four strain gauges in their series-parallel configuration as the bottom element. Simple compression of the beam compresses all four strain gauges equally, so the resistance of their series-parallel configuration gives a measure of the compression. There is no matching change in resistor 16, of course, so this is a "single-ended" divider. The relation between the magnitude of the Z signal and that of the X and Y signals depends on the geometry and material of the sensor beam.

The three input signals, X, Y and Z, are input to respective operational amplifiers 17, 18 and 19, the outputs of which are measured successively. While X and Y are being measured, the FET 15 is closed, so XYDACBIAS=VREG, thereby shorting out resistor 16. Also, switch 20 controlled by AC6 is open (ZDAC is disconnected), and the FET 21 is closed, so XYSOURCE is connected to VREG, controlling the slope of XYRAMP.

For each of X and Y, a comparison voltage is generated by combining three voltages; a base voltage, the output of the digital-to-analog converter (DAC) on the 83C754 chip, and XYZRAMP. The base voltage, approximately VREG/2, the nominal stick voltage, is generated by the divider consisting of resistors 22 and 23. The voltage XYDAC, which is the output of the DAC on the chip, has a setting determined at power-on calibration. The DAC output ranges over the interval 0-VREG, and is scaled down by resistor 24 to allow the comparison voltage to be set anywhere in the expected range of X and Y sensor output voltages. This range is determined by the tolerances of the various components, perhaps ±3% or ±60 mV. The DAC is set by an iterative search algorithm so that the signal voltage is approximately at the mid-point of the sampling sweep. The voltage XYZRAMP sweeps up from zero when FET 25 is opened. When FET 25 is closed, XYZRAMP is held at ground, but when it opens, charge starts to build up in capacitor 26, raising the voltage toward VREG. This voltage is scaled down through resistor 27 to sweep the comparison voltage across the useful signal range of about 6 mV during the sampling period of about 60 $\mu$sec.

The analog multiplexer (MUX) 28 on the 83C754 chip is set to transmit the output of the operational amplifier corresponding to the signal being measured (say X) to the on-chip comparator 29. FET 25 is opened and the timer is started. The comparison voltage sweeps across the working range of the pointing stick output, and when it passes the stick voltage, the X operational amplifier 17 turns on, producing a steeply rising voltage. This passes through the MUX 28 to the comparator 29 which picks off the time when the amplifier output passes the BANDGAP REF, and stops the timer. The timer reading gives the required measurement of the stick voltage.

The measurement of Z is similar, except that FET 15 is open, so resistor 16 and the entire sensor bridge as one resistance, make up a divider, switch 20 is closed so resistor 35 is put in parallel with resistor 24 to deliver the DAC output to the comparison voltage, and FET 21 is open so the ramp is powered through resistor 30, to match the different characteristic of the Z signal.

In order to get sufficient isolation from power supply noise and variations, the analog circuitry is isolated from Vcc while measurements are being made. FET 31 is open and FET 32 is closed, so power is supplied from capacitor 33. Prior to each measurement, FET 32 is opened and FET 31 is controlled by comparator 34 to charge capacitor 33 to a regulated voltage a bit below the minimum allowed Vcc (4.5 volts for nominal 5 volt circuitry), based on the BAND-GAP REF, and independent of Vcc. During the measurement, its voltage (VREG) decays due to the power dissipation in the circuit. Between sampling times, both FETs 31 and 32 are open, so capacitor 33 loses charge only due to its internal leakage, which is typically minimal. To avoid interference from the digital switching transients of the microprocessor with the analog comparator switching time, the microprocessor is placed in idle mode, thereby removing its internal clock drive signals (and associated transients) from all of the microprocessor's internal circuitry except the timer which is being used to make the measurement. This isolation allows the circuit to make stable and accurate measurements of the 30 $\mu$V input signal in the presence of as much as one volt noise, of any frequency, on the five volt processor supply.

Relatively inexpensive resistors have sufficiently close tolerance for any required measurement accuracy. Capacitors with tight tolerances are more expensive. In particular, the values of capacitor 33 and especially capacitor 26 affect the accuracy of measurement. The linearity of the DAC can be used for calibration, to allow the use of inexpensive capacitors. In the power-on calibration process, a DAC setting is found at which the value measured for the signal is roughly mid-scale. Each DAC step should correspond to a certain number of units in the measurement, for example 10 in a range of 200, and does not depend on the values of the capacitors. If the DAC setting is changed by a certain number of steps, the measured value should change by the corresponding amount. Any discrepancy can be used as a correction factor to be applied to subsequent measurements.

This circuit is very robust against power supply variations, over the entire ±10% range. The inputs and the comparison voltage carry signal at the 30 $\mu$V level, and are correspondingly subject to noise, but both are relatively low impedance, so are resistant to pickup. Other nets are about 30 or more times less sensitive. Of course extraneous ground currents producing differences from place to place in AVss must be avoided. In particular, ground return from the sensor should be close to the ground end of resistor 23.

Figure 2:
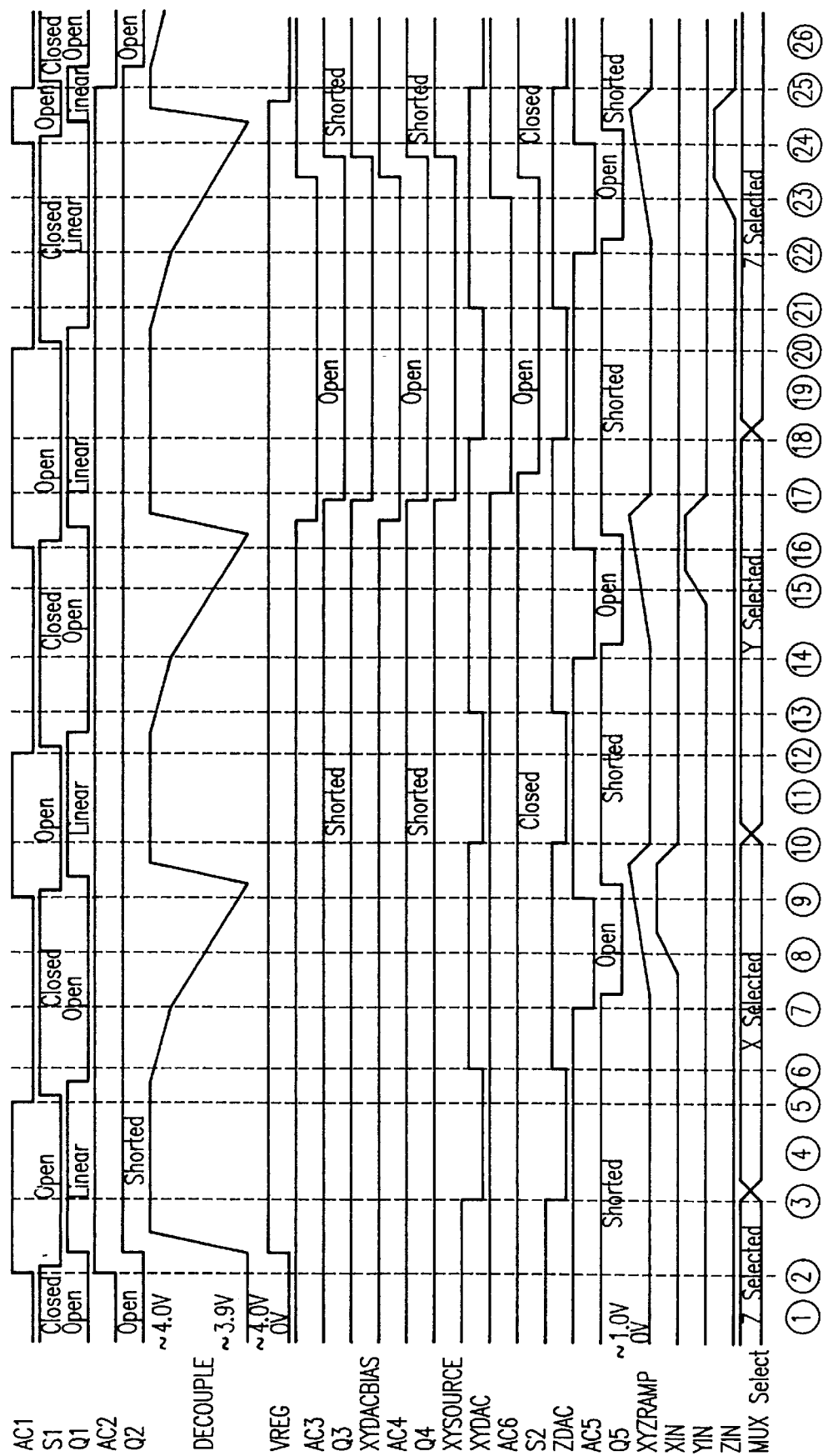
FIG. 2 is a timing diagram illustrating the operation of the circuit of FIG. 1.

The operation of the circuit of FIG. 1 is illustrated by way of the timing diagram of FIG. 2. The timing points, represented by encircled numbers at the bottom of the figure, are described in the following table.

| TIMING POINT | OPERATION |
|---|---|
| 1 | Start Conversion Cycle |
| 2 | Delay for Op-amp Stabilization and Cap Recharge |
| 3 | Select X Mux, Zero DAC Output |
| 4 | Delay for Mux and DAC Settle |
| 5 | Isolate Power from Vcc |
| 6 | Set X DAC Value |

-continued

| TIMING POINT | OPERATION |
|---|---|
| 7 | Release Ramp Capacitor, Start Time, Idle Micro |
| 8 | Comparator Trip, Stop Timer, Run Micro |
| 9 | Short Ramp Cap, Recharge Decouple Cap |
| 10 | Select Y Mux, Zero DAC Output |
| 11 | Delay for Mux and DAC Settle |
| 12 | Isolate Power from Vcc |
| 13 | Set Y DAC Value |
| 14 | Release Ramp Capacitor, Start Timer, Idle Micro |
| 15 | Comparator Trip, Stop Timer, Run Micro |
| 16 | Short Ramp Cap, Recharge Decouple Cap |
| 17 | Change Ramp Bias, Change Sensor Bias |
| 18 | Select Z Mux, Zero DAC Output |
| 19 | Delay tor Mux and DAC Settle |
| 20 | Isolate Power from Vcc |
| 21 | Set Z DAC Value |
| 22 | Release Ramp Capacitor, Start Timer, Idle Micro |
| 23 | Comparator Trip, Stop Timer, Run Micro |
| 24 | Short Ramp Cap, Recharge Decouple Cap |
| 25 | Float Decouple Cap |
| 26 | Conversion Cycle Complete |

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A circuit for making precise measurements of the ratio of two resistance comprising:
   means for generating a reference voltage close to that generated by the two resistances connected as a voltage divider based on a voltage source;
   means for adding to the reference voltage a voltage ramp of known slope, also based on the same voltage source;
   comparator means for recognizing coincidence between the voltage generated by the two resistances connected as a voltage divider and a sum of the reference voltage and the voltage ramp with high precision; and
   means for timing the occurrence of said coincidence, and thereby measuring changes in the voltage, and thus the ratio of the two resistances.

2. The circuit for making precise measurements of the ratio of two resistances recited in claim 1 wherein measurements are made of several interconnected pairs of resistances further comprising multiplexer means interposed before said comparator means, such that measurements may be made on the several interconnected pairs of resistances during a predetermined time period.

3. The circuit for making precise measurements of the ratio of two resistances recited in claim 1 further comprising means for isolating the circuit from a source of supply voltage during a measurement period to render the measurement insensitive to variations in the supply voltage.

4. The circuit for making precise measurements of the ratio of two resistances recited in claim 3 wherein said means for isolating includes voltage regulation means based on physical properties of components in the circuit to render the circuit insensitive to variations in the supply voltatge on long time scales.

5. A method of making precise measurements of the ratio of two resistance comprising:
   generating a reference voltage close to that generated by the two resistances connected as a voltage divider based on the same voltage source;
   adding to the reference voltage a voltage ramp of known slope, also based on said same voltage source;
   detecting coincidence between the voltage generated by the two resistances connected as a voltage divider and a sum of the reference voltage and the voltage ramp with high precision; and
   timing the occurrence of said coincidence, and thereby measuring changes in the voltage, and thus the ratio of the two resistances such that measurements may be made on several interconnected pairs of resistances.

6. The method for making precise measurements of the ratio of two resistances recited in claim 5 wherein measurements are made of several interconnected pairs of resistances further comprising the step of separately detecting coincidence for each pair of resistances, such that measurements may be made on the several interconnected pairs of resistances during a predetermined time period.

7. The method for making precise measurement of the ratio of two resistances recited in claim 5 further comprising the step of isolating the circuit from a source of supply voltage during a measurement period to render the measurement insensitive to variations in the supply voltage.

8. A circuit for generating cursor control signals for a controlling a cursor on a graphic display device comprising:
   a sensor including first, second, third, and fourth strain gauges mounted on a cantilever beam, the strain gauges being electrically connected in two parallel half-bridge circuits between a source of voltage and circuit ground;
   a voltage divider connected between said source of reference voltage and circuit ground;
   first and second operational amplifiers connected to respective mid-points of said half bridge circuits and, in common, to a tap of said voltage divider;
   an RC ramp circuit connected between said source of voltage and circuit ground and supplying a ramp voltage of known slope to said tap of said voltage divider, said first and second operational amplifiers turning on and generating respective rising X and Y output signals corresponding to outputs from said sensor;
   a switch connected to said RC ramp circuit to first discharge the ramp circuit and then initiate a charging cycle to generate said ramp voltage;
   a multiplexer connected to receive and selectively pass the rising X and Y output signals from the first and second operational amplifiers;
   a comparator connected to the multiplexer and generating an output when a voltage passed by the multiplexer equals a predefined threshold; and
   a timer controlled to start at a start of the ramp voltage and to stop when said comparator generates an output, the timer giving a reading of a corresponding one of said X and Y voltage outputs to cursor control circuitry.

9. The circuit for generating cursor control signals for a controlling a cursor on a graphic display device recited in claim 8 further comprising:
   a third operational amplifier circuit connected to said parallel half-bridge circuits and to a tap of said voltage divider, said RC ramp circuit supplying a ramp voltage to said tap of said voltage divider, said third operational amplifier turning on and generating a Z output signal corresponding to a third output of said sensor; and
   bias means connected to said RC ramp circuit and to said sensor for changing a ramp bias and sensor bias during a measurement of said Z output signal, said multiplexer being connected to receive and selectively pass the Z output signal from the third operational amplifier to said comparator, and the timer giving a reading of said Z voltage output.

10. The circuit for generating cursor control signals for controlling a cursor on a graphic display device recited in claim 8 further comprising a storage capacitor alternately connected to a source of supply voltage and to said circuit to power the circuit while it is isolated from the supply voltage.

11. The circuit for generating cursor control voltages for controlling a cursor on a graphic display device recited in claim 10 further comprising voltage regulation means based on bandgap properties of the components to render the measurement insensitive to variations in the supply voltage.

12. The method for making precise measurements of the ratio of two resistances as recited in claim 5, wherein said measurements made on on several interconnected pairs of resistances are made simultaneously.

\* \* \* \* \*